United States Patent
Masuzawa et al.

(10) Patent No.: US 6,414,773 B1
(45) Date of Patent: Jul. 2, 2002

(54) OPTICAL DIGITAL COMMUNICATION APPARATUS

(75) Inventors: Kazutaka Masuzawa; Mikio Aoki, both of Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/323,947

(22) Filed: Jun. 2, 1999

(30) Foreign Application Priority Data

Jun. 2, 1998 (JP) .......................................... 10-152433

(51) Int. Cl.[7] .............................................. H04B 10/00
(52) U.S. Cl. ....................................... 359/156; 359/192
(58) Field of Search ................................. 359/156, 192, 359/191, 122

(56) References Cited

U.S. PATENT DOCUMENTS 6,330,092 B1 * 12/2001 Aronson ...................... 359/156

FOREIGN PATENT DOCUMENTS

| JP | H8-294184 | 11/1996 |
| JP | H9-321704 | 12/1997 |
| JP | H9-321705 | 12/1997 |
| JP | H10-190572 | 7/1998 |
| JP | H10-190581 | 7/1998 |

* cited by examiner

*Primary Examiner*—Jason Chan
*Assistant Examiner*—Christina Y Leung
(74) *Attorney, Agent, or Firm*—Lowe Hauptman Gilman & Berner, LLP

(57) ABSTRACT

In a transmission section (1), a light-emitting element (13) is driven by a digital signal (DS1) serving as an object of transmission, light emitted from the light-emitting element (13) is split by a beam splitter (17) into two linearly polarized light components which are orthogonal to each other, and the linearly polarized light components are radiated by ¼-wavelength plates (15A and 15C) into the air as circularly polarized light components having the same rotating direction. In a reception section (2), the circularly polarized light components radiated from the transmission section (1) and circularly polarized light components having a reverse rotating direction are received by two different light-receiving elements (23A and 23B), and the difference of the levels of two electric signals output from the two light-receiving elements (23A and 23B) is calculated by a subtraction circuit (24), so that a digital signal serving as an object of transmission is obtained by removing a disturbance noise component. With this arrangement, an optical digital communication apparatus which can reduce influence of disturbance optical noise, improve an S/N ratio, and extend a communication distance.

9 Claims, 13 Drawing Sheets

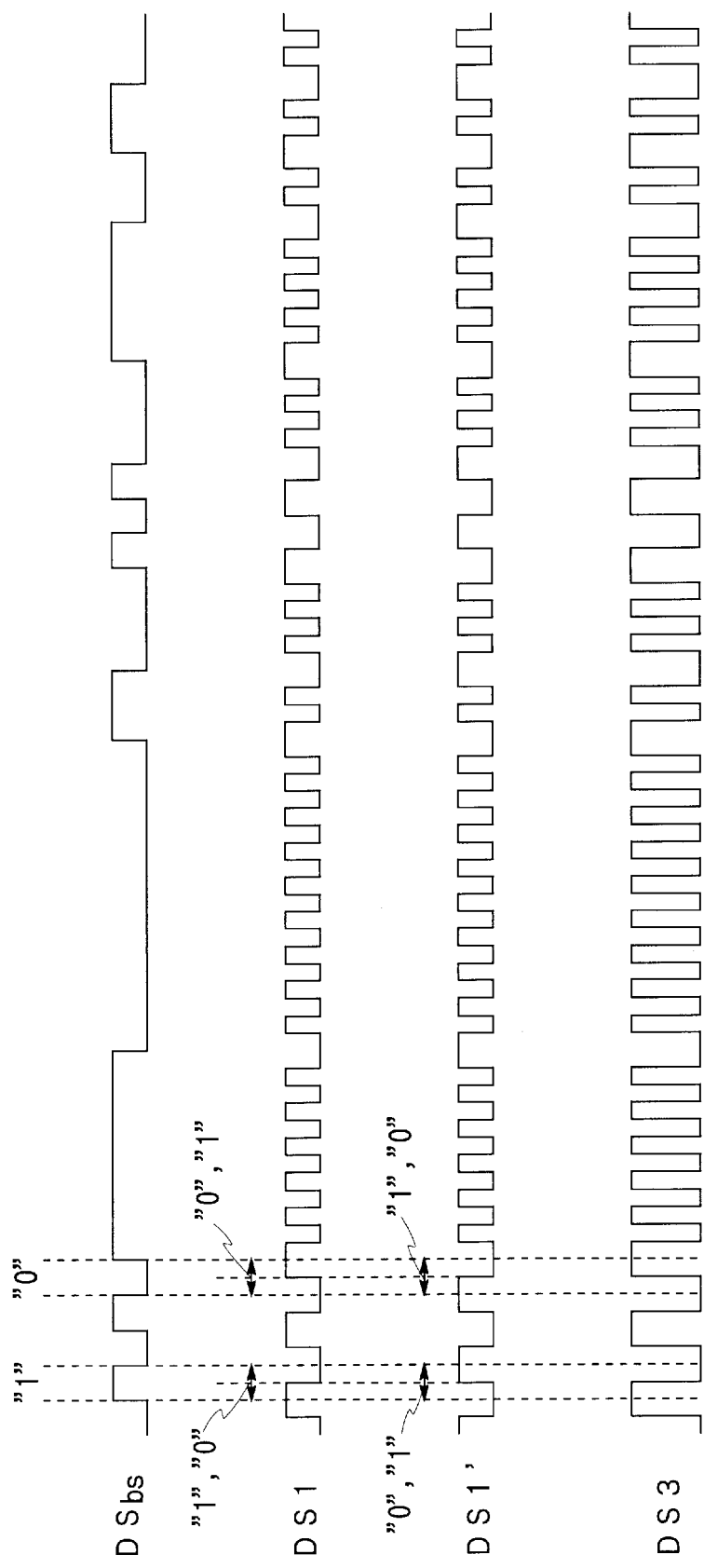

OPTICAL DIGITAL COMMUNICATION APPARATUS

BACKGROUND OF THE INVENTION

1. Field of the Invention

The present invention relates to an optical digital communication apparatus for transmitting and receiving digital data by using light.

2. Description of Related Art

As a conventional optical digital data communication apparatus is constituted by a transmission section and a reception section. In the transmission section, an infrared LED or a laser diode is driven by a digital electric signal corresponding to digital data to be transmitted, and an infrared signal corresponding to the data is radiated into space.

The reception section receives the infrared signal radiated from the transmission section by an infrared-receiving element such as a photodiode and convert the infrared signal into an analog electric signal. In addition, in the reception section, the obtained analog electric signal is amplified and then converted into a digital signal by a comparator or the like.

An infrared digital data communication apparatus generally performs communication between modules each having both of a transmission section and a reception section. However, the infrared digital data communication apparatus may perform communication between a module having only a transmission section and a module having only a reception section.

However, as one of factors which limits a communication distance, there is disturbance optical noise. As disturbance optical noise in the infrared digital data communication apparatus, noise such as sunlight, radiation light from an incandescent lamp or radiation light from a fluorescent lamp are known. In order to remove influence of such disturbance optical noise, various countermeasures are made in reception sections.

As a main countermeasure for removing influence of such disturbance optical noise, an arrangement of an optical filter, a device of the position of a light-receiving element, or the like is performed in an optical manner, and a method of using a filter is performed in an electric manner. However, according to these methods, shielding or filtering prevents receiving of disturbance optical noise, or received disturbance optical noise is removed by an electric filter. As a result, the disturbance noise cannot be completely removed.

For this reason, the present applicant has proposed an optical digital communication apparatus having the following arrangement in Japanese Patent Application No. 8-348878 (Japanese Patent Application Laid-Open No. 9-321705), Japanese Patent Application No. 8-348873 (Japanese Patent Application Laid-Open No. 9-321704), or the like. That is, two different optical signals are received to be converted into electric signals, and the level difference between the electric signals is detected to make it possible to remove a noise component.

An arrangement disclosed in Japanese Patent Application No. 8-348878 (Japanese Patent Application Laid-open No. 9-321705) is shown in FIG. 2 (to be referred to as a first prior art hereinafter). The optical digital communication apparatus shown in FIG. 2 converts a digital electric signal serving as an object of transmission into an optical signal in a transmission section 1, emits the optical signal from the transmission section 1 to a reception section 2, and converts the optical signal received by the reception signal 2 into an electric signal.

The transmission section 1 is constituted by a digital signal input terminal 11, a drive circuit 12, a light-emitting element 13, a linearly polarizing plate 14, and a ¼-wavelength plate 15.

The light-emitting element 13 is driven through the drive circuit 12 by a digital signal DS1 input to the digital signal input terminal 11 and serving as an object of transmission, and an optical signal is output from the light-emitting element 13.

In addition, the optical signal is linearly polarized by the linearly polarizing plate 14 arranged on the light-emitting side of the light-emitting element 13, and then is emitted by the ¼-wavelength plate 15 into space as a circularly polarized light component or an elliptically polarized light component.

On the other hand, the reception section 2 is constituted by ¼-wavelength plates 21A and 21B, linearly polarizing plates 22A and 22B, light-receiving elements 23A and 23B constituted by PIN photodiodes, and a subtraction circuit 24.

The light-receiving element 23A receives an optical light radiated from the transmission section and converts the optical signal into an electric signal DS2 to output the electric signal DS2. The light-receiving element 23B receives disturbance light scattered in space and converts the disturbance light into an electric signal DS2' to output the electric signal DS2'.

A ¼length plate 21A and a linearly polarizing plate 22A are arranged on the light incident side of the light-receiving element 23A. The ¼length plate 21A and the linearly polarizing plate 22A convert circularly polarized light components or elliptically polarized light components radiated from the transmission section 1 into linearly polarized light components to cause the linearly polarized light components to be incident on the light-receiving element 23A.

The ¼length plate 21B and the linearly polarizing plate 22B are arranged on the light incident side of the light-receiving element 23B. The ¼length plate 21B and the linearly polarizing plate 22B convert circularly polarized light components or elliptically polarized light components having a rotating direction which is different from that of the circularly polarized light components or the elliptically polarized light component radiated from the transmission section 1 into linearly polarized light components to cause the linearly polarized light components to be incident on the light-receiving element 23B.

The output signals DS2 and DS2' from the two light-receiving elements 23A and 23B are input to the subtraction circuit 24. An electric signal DS3 having a voltage level obtained such that the subtraction circuit 24 subtracts the voltage level of the electric signal DS2' output from the other light-receiving element 23B from the voltage level of the electric signal DS2 output from the light-receiving element 23A is output.

On the other hand, the main electric system circuit of the transmission section 1 and the reception section 2 has the arrangement shown in FIG. 3. More specifically, the drive circuit 12 in the transmission section 1 is constituted by resistors 121 to 124 and a transistor 125, and the digital signal DS1 is input to one terminal of the resistor 121. The other terminal of the resistor 121 is connected to the base of the transistor 125 and one terminal of the resistor 122, and the emitter of the transistor 125 is connected to the one terminal of the resistor 123. A predetermined voltage +V is applied to the other terminals of the resistors 122 and 123. Furthermore, the collector of the transistor 125 is connected to the anode of the light-emitting element (LED) 13 through the resistor 124, and the cathode of the light-emitting element (LED) 13 is grounded.

With the arrangement, the transistor 125 is switching-operated in response to the digital signal DS1 to apply a voltage to the light-emitting element 13, thereby driving the light-emitting element 13.

In the reception section 2, the subtraction circuit 24 is constituted by a resistor 241 and an amplifier 242, and one terminal of the resistor 241 is connected to the anode of the light-receiving element (photodiode) 23A, the cathode of the light-emitting element (photodiode) 23B, and the input terminal of the amplifier 242, and the other terminal of the resistor 241 is grounded. Furthermore, a predetermined positive voltage +V1 is applied to the cathode of the light-receiving element 23A, and a predetermined negative voltage −V1 is applied to the anode of the light-receiving element 23B.

With the arrangement, a voltage having a difference between an output voltage of the light-receiving element 23A and an output voltage of the light-receiving element 23B is input to the amplifier 242.

With the arrangement described above, disturbance optical noise components equally input to the two light-receiving elements 23A and 23B are removed by the subtraction circuit 24. The electric signal DS2 output from one light-receiving element 23A has the same phase as that of the digital signal DS1 serving as an object of transmission, and the electric signal DS2' output from the other light-receiving element 23B includes only a disturbance optical noise component. For this reason, when the difference between the voltage levels of these electric signals is calculated, the electric signal DS3 having the same phase as that of the digital signal DS1 serving as an object of transmission and an electric signal level output from the light-receiving element 23A can be obtained.

Therefore, disturbance optical noise can be removed, so that only a digital signal serving as an object of transmission can be obtained. In addition, influence of disturbance optical noise can be considerably reduced in comparison with the prior art, and a communication distance can be extended.

The optical digital communication apparatus disclosed in Japanese Patent Application No. 8-348873 (Japanese Patent Application Laid-Open No. 9-321704), as shown in FIG. 4 (to be referred to at the second prior art hereinafter), is designed such that two systems of optical signals can be emitted from the transmission section 1. In addition, a circularly polarized light component or an elliptically polarized light component which has the same phase as that of the digital signal DS1 serving as an object of transmission and can be received by one light-receiving element 23A is used as one optical signal, and a circularly polarized light component or an elliptically polarized light component which has a phase reversed to the phase of the digital signal DS1 and can be received by the other light-receiving element 23B is used as the other optical signal.

With the arrangement, disturbance optical noise components equally input to the two light-receiving elements 23A and 23B are removed by the subtraction circuit 24. An electric signal DS2 output from one light-receiving element 23A has the same phase as that of a digital signal DS1 serving as an object of transmission, and an electric signal DS2' output from the other light-receiving element 23B has a phase which is different from that of the digital signal DS1 by 180°. For this reason, when the difference between the voltage levels of these electric signals is calculated, an electric signal DS3 having the same phase as that of the digital signal DS1 serving as an object of transmission and a level obtained by adding electric signal levels output from the two light-receiving elements 23A and 23B can be obtained.

Therefore, since the optical signals propagate as the circularly polarized light component or elliptically polarized light component in space, a variation in reception level caused by the rotating angles of the transmission section 1 and the reception section 2 is prevented, and disturbance optical noise is removed, so that only a digital signal serving as an object of transmission can be obtained. Influence of disturbance optical noise can be considerably reduced in comparison with the prior art, and a communication distance can be extended.

However, in the first and second prior arts described above, since the polarization angles of light components radiated from the light-emitting elements 13A and 13B (LED) of the transmission section 1 have isotropy, the intensities of linearly polarized light components emitted from the linearly polarizing plates 14A and 14B are half the intensities of light components radiated from the light-emitting elements 13A and 13B. For this reason, an S/N ratio decreases. In order to improve the S/N ratio, powers supplied to the light-emitting elements 13A and 13B must be increased. As a result, energy saving is hindered.

In addition, power supply circuits for generating two positive and negative voltages "+V1" and "−V1" in the reception section 2 are required, and simplification of the circuit and a decrease in size of the circuit are limited. When only a positive voltage "+V1" is used as one of the power supply circuits, the two light-receiving elements 23A and 23B are connected in series with each other. For this reason, the voltages applied to the light-receiving elements 23A and 23B are ½"+V1", and degradation of sensitivity caused by a decrease in signal amplitude, a decrease in response speed, and the like occur.

SUMMARY OF THE INVENTION

The present invention has been made in consideration of the above problems, and has as its object to provide a digital communication apparatus in which influence of disturbance optical noise is reduced, an S/N ratio is improved, and a communication distance can be extended.

The present invention, in order to achieve the above object, constitutes an optical digital communication apparatus comprising: a transmission section including a light-emitting element for emitting light in response to a digital signal serving as an object of transmission and optical signal emission means for dividing the optical signal emitted from the light-emitting element in two as two linearly polarized light components which are orthogonal to each other and for emitting the two linearly polarized light components as circularly polarized light components or elliptically polarized light components having the same rotating direction; and a reception section including first light-receiving means for receiving only circularly polarized light components or elliptically polarized light components having the rotating direction of the circularly polarized light components or the elliptically polarized light components emitted from the optical signal emission means of the transmission section to convert the circularly polarized light components or the elliptically polarized light components into an electric signal, second light-receiving means for receiving only circularly polarized light components or elliptically polarized light components having a rotating direction different from that of the circularly polarized light components or the elliptically polarized light components emitted from the optical signal emission means of the transmission section to convert the circularly polarized light components or the elliptically polarized light components into an electric signal, and subtraction means for outputting a difference between an electric signal output from the first light-receiving means and an electric signal output from the second light-receiving means.

In the optical digital communication apparatus with the arrangement described above, light having an intensity which is almost equal to that of light emitted from the light-emitting element of the transmission section. If attenuation in the air is not considered, almost all of optical signals radiated from the light-emitting element within a solid angle obtained when the light-receiving surface of the reception section is viewed from the light-emitting surface (position of wavelength plate) of the transmission section are received by the reception section, so that the optical signals can be reproduced as electric signals. More specifically, when the radiation intensity of light emitted from the light-emitting element is equal to that of a prior art, the intensity of light received by the light-receiving surface is twice that in the prior art. For this reason, an S/N ratio can be improved in comparison with the prior art, and energy saving can be achieved.

More specifically, since light emitted from the light-emitting element of the transmission section is divided in two as two linearly polarized light components which are orthogonal to each other, the intensities of the linearly polarized light components are ½ the intensity of the light emitted from the light-emitting element. One of the linearly polarized light components is emitted as a circularly polarized light component or an elliptically polarized light component having one rotating direction, and the other linearly polarized light component is emitted as a circularly polarized light component or an elliptically polarized light component having the same rotating direction as described above. Therefore, the sum of the light intensities of the two circularly polarized light components or the two elliptically polarized light components emitted from the transmission section is almost equal to the intensity of the light emitted from the light-emitting element.

In the reception section, both of the two circularly polarized light components or the two elliptically light components emitted from the transmission section and having the same rotating direction are received by the first light-receiving means. Therefore, the first light-receiving means receives almost all of optical signals radiated from the light-emitting element within a solid angle obtained when the light-receiving surface of the reception section is viewed from the light-emitting surface (position of wavelength plate) of the transmission section and scattered light in space. In addition, when the radiation intensity of light radiated from the light-emitting element is equal to that in the prior art, the intensity of the light received by the light-receiving surface is twice the intensity of light in the prior art. For this reason, in the electric signal output from the first light-receiving means, the intensity of a digital signal component serving as an object of transmission is twice the intensity of a digital signal component in the prior art.

The second light-receiving means receives a circularly polarized light or an elliptically polarized light component having the other rotating direction different from the rotating direction of the optical signal emitted from the transmission section. The circularly polarized light component or the elliptically polarized light component is scattered light in space.

In addition, the subtraction means outputs the difference between an electric signal output from the first light-receiving means and an electric signal output from the second light-receiving means. A scattered light component is removed by the subtraction. Therefore, an electric signal output from the subtraction means is a digital signal serving as an object of transmission.

The present invention constitutes an optical digital communication apparatus comprising: a transmission section including a first light-emitting element for emitting light in response to a digital signal serving as an object of transmission, first optical signal emission means for dividing an optical signal emitted from the first light-emitting element in two as two linearly polarized light components which are orthogonal to each other and for emitting the two linearly polarized light components as circularly polarized light components or elliptically polarized light components having a first rotating direction, a second light-emitting element for emitting light in response to a digital signal obtained by inverting the digital signal serving as an object of transmission, and second optical signal emission means for dividing an optical signal emitted from the second light-emitting element in two as two linearly polarized light components which are orthogonal to each other and for emitting the two linearly polarized light components as circularly polarized light components or elliptically polarized light components having a second rotating direction which is different from the first rotating direction; and a reception section including first light-receiving means for receiving only circularly polarized light components or elliptically polarized light components having the rotating direction of the circularly polarized light components or the elliptically polarized light components emitted from the first optical signal emission means of the transmission section to convert the circularly polarized light components or the elliptically polarized light components into an electric signal, second light-receiving means for receiving circularly polarized light components or elliptically polarized light components having the rotating direction of the circularly polarized light components or the elliptically polarized light components emitted from the second optical signal emission means of the transmission section to convert the circularly polarized light components or the elliptically polarized light components into an electric signal, and substraction means for outputting a difference between an electric signal output from the first light-receiving means and an electric signal output from the second light-receiving means.

The transmission section of the optical digital communication apparatus with the arrangement described above comprises the two arrangements of the transmission sections in the optical digital communication apparatus described above, and emits circularly polarized light components or elliptically polarized light components having different rotating directions. In addition, the circularly polarized light component or the elliptically polarized light component having one rotating direction is an optical signal corresponding to a digital signal serving as an object of transmission, and the circularly polarized light component or the elliptically polarized light component having the other rotating direction is an optical signal corresponding to a digital signal obtained by inverting the digital signal.

Therefore, light having an intensity which is almost equal to the intensity of light emitted from the first and second light-emitting elements of the transmission section is emitted as an optical signal. If attenuation in the air is not considered, almost all of optical signals radiated from the light-emitting element within a solid angle obtained when the light-receiving surface of the reception section is viewed from the light-emitting surface (position of wavelength plate) of the transmission section are received by the reception section, so that the optical signals can be reproduced as electric signals. More specifically, when the radiation intensity of light emitted from the light-emitting element is equal to that of a prior art, the intensity of light received by the light-receiving surface is twice that in the prior art. For this reason, an S/N ratio can be improved in comparison with the prior art, and energy saving can be achieved.

More specifically, since light emitted from the first light-emitting element of the transmission section is divided in two as two linearly polarized light components which are orthogonal to each other, the intensities of the linearly polarized light components are ½ the intensity of the light emitted from the first light-emitting element. One of the linearly polarized light components is emitted as a circularly polarized light component or an elliptically polarized light component having one rotating direction, and the other linearly polarized light component is emitted as a circularly polarized light component or an elliptically polarized light component having the same rotating direction as described above.

Therefore, the sum of the light intensities of the two circularly polarized light components or the two elliptically polarized light components having one rotating direction and corresponding to the optical signal emitted from the first light-emitting element of the transmission section is almost equal to the intensity of the light emitted from the first light-emitting element. The sum of the light intensities of the two circularly polarized light components or the two elliptically polarized light components corresponding to the optical signal emitted from the second light-emitting element of the transmission section is almost equal to the intensity of the light emitted from the second light-emitting element.

In the reception section, both the two circularly polarized light components or both the two elliptically polarized light components emitted from the transmission section and having one rotating direction are received by the first light-receiving means. In addition, both the two circularly polarized light components or both the two elliptically polarized light components emitted from the transmission section and having the other rotating direction are received by the second light-receiving means.

Therefore, the first and second light-receiving means receive almost all of optical signals radiated from the light-emitting element within a solid angle obtained when the light-receiving surface of the reception section is viewed from the light-emitting surface (position of wavelength plate) of the transmission section and scattered light in space. In addition, when the radiation intensity of light radiated from the light-emitting element is equal to that in the prior art, the intensity of the light received by the light-receiving surface is twice the intensity of light in the prior art. For this reason, in the electric signal output from the first and second light-receiving means, the intensity of a digital signal component serving as an object of transmission is twice the intensity of a digital signal component in the second prior art.

The circularly polarized light components or the elliptically polarized light components received by the first and second light-receiving means include digital signal components and scattered light components in space.

In addition, a difference between an electric signal output from the first light-receiving means and an electric signal output from the second light-receiving means is output by the subtraction means. With this subtraction, a scattered light component is removed. The digital signal component output from the first light-receiving means and the digital signal component output from the second light-receiving means are inverted to each other.

Therefore, the electric signal output from the subtraction means is a digital signal serving as an object of transmission.

In the present invention, the optical signal emission means described above is constituted by: a beam splitter, on which light emitted from the light-emitting element is incident, for emitting the incident light as two linearly polarized light components which are orthogonal to each other; a first wavelength plate, on which one linearly polarized light component emitted from the beam splitter is incident, for emitting the light component as a circularly polarized light component or an elliptically polarized light component having one rotating direction in a predetermined transmission direction; a second wavelength plate, on which the other linearly polarized light component emitted from the beam splitter, for emitting the light component as a circularly polarized light component or an elliptically polarized light component having one rotating direction; and guide means for causing the other linearly polarized light component emitted from the beam splitter to be incident on the second wavelength plate.

In the arrangement described above, light emitted from the light-emitting element is emitted by the beam splitter as two linearly polarized light components which are orthogonal to each other and have a light intensity which is almost ½ the intensity of the incident light.

One linearly polarized light component emitted from the beam splitter is converted by the first wavelength plate of $\lambda/4$, $\lambda/5$, or the like into a circularly polarized light component or an elliptically polarized light component having a first rotating direction, and the circularly polarized light component or the elliptically polarized light component is radiated into the air in a predetermined transmission direction. In addition, the other linearly polarized light component emitted from the beam splitter is incident on the second wavelength plate which is similar to the first wavelength plate by the guide means. The linearly polarized light component is converted by the second wavelength plate into a circularly polarized light component or an elliptically polarized light component having the first rotating direction, and the circularly polarized light component or the elliptically polarized light component is radiated into the air.

In the present invention, the reception section is constituted by: a third wavelength plate, on which a circularly polarized light component or an elliptically polarized light component having a first rotating direction is incident, for emitting a light component as a linearly polarized light component; a first linearly polarizing plate arranged to transmit only the linearly polarized light component emitted from the third wavelength plate; a fourth wavelength plate, on which a circularly polarized light component or an elliptically polarized light component having a second rotating direction different from the first rotating direction is incident, for emitting a light component as a linearly polarized light component; a second linearly polarizing plate arranged to transmit only the linearly polarized light component emitted from the fourth wavelength plate; a first light-receiving element, on which the linearly polarized light component emitted from the first linearly polarizing plate is incident, for converting the linearly polarized light into an electric signal; a second light-receiving element, on which the linearly polarized light component emitted from the second linearly polarizing plate is incident, for converting the linearly polarized light component into an electric signal; and a subtraction circuit for receiving the electric signals output from the first and second light-receiving elements and outputting a difference between these electric signal levels.

In the present invention, a photodiode having a cathode connected to a power supply is used as the first light-receiving element, and a photodiode having a grounded anode is used as the second light-receiving element. In addition, the subtraction circuit is constituted by: a first impedance element connected between the anode of the first light-receiving element and the ground and having a resistance lower than the resistance of the first light-receiving element; a second impedance element connected between the cathode of the second light-receiving element and a power supply and having a resistance lower than the resistance of the second light-receiving element; a first capacitance element connected between the anode of the first light-receiving element and a first output terminal; a second capacitance element connected between the cathode of the second light-receiving element and a second output terminal; and an arithmetic operation circuit for outputting an electric signal having a difference between an electric signal output from the first output terminal and an electric signal output from the second output terminal.

In this arrangement, a voltage applied across the anode and the cathode of a first photodiode is a voltage obtained such that a power supply voltage is divided by the resistance of the first photodiode and the resistance of the first impedance element when no light is incident on the first photodiode, and the potential of the anode of the first photodiode is lower than ½ of the power supply voltage. When the resistance of the first impedance element is set to be low, the potential of the anode can be set to be a ground potential, i.e., a potential which is approximate to 0 V.

When light is incident on the first photodiode, the resistance of the first photodiode decreases depending on the intensity of the incident light, and a voltage applied across the anode and the cathode of the first photodiode decreases. Accordingly, a voltage applied across both the terminals of the first impedance element decreases. Therefore, the potential of the anode of the first photodiode positively changes in response to the intensity of the incident light on the first photodiode.

On the other hand, a voltage applied across the anode and the cathode of a second photodiode is a voltage obtained such that a power supply voltage is divided by the resistance of the second photodiode and the resistance of the second impedance element when no light is incident on the second photodiode, and the potential of the cathode of the second photodiode is higher than ½ of the power supply voltage. When the resistance of the second impedance element is set to be low, the potential of the cathode can be set to be a potential which is approximate to the power supply voltage.

When light is incident on the second photodiode, the resistance of the second photodiode decreases depending on the intensity of the incident light, and a voltage applied across the anode and the cathode of the second photodiode decreases. Accordingly, a voltage applied across both the terminals of the second impedance element increases. Therefore, the potential of the cathode of the second photodiode negatively changes in response to the intensity of the incident light on the second photodiode.

In addition, an AC component at the anode of the first photodiode passes through a first capacitor, and an AC component at the cathode of the second photodiode passes through a second capacitor, so that these AC components are synthesized with each other.

BRIEF DESCRIPTION OF THE DRAWINGS

FIG. 13 is a waveform chart showing another example of a digital signal serving as an object of transmission in the present invention.

DETAILED DESCRIPTION OF THE INVENTION

This invention will be further described below with reference to the accompanying drawings.

Figure 1:
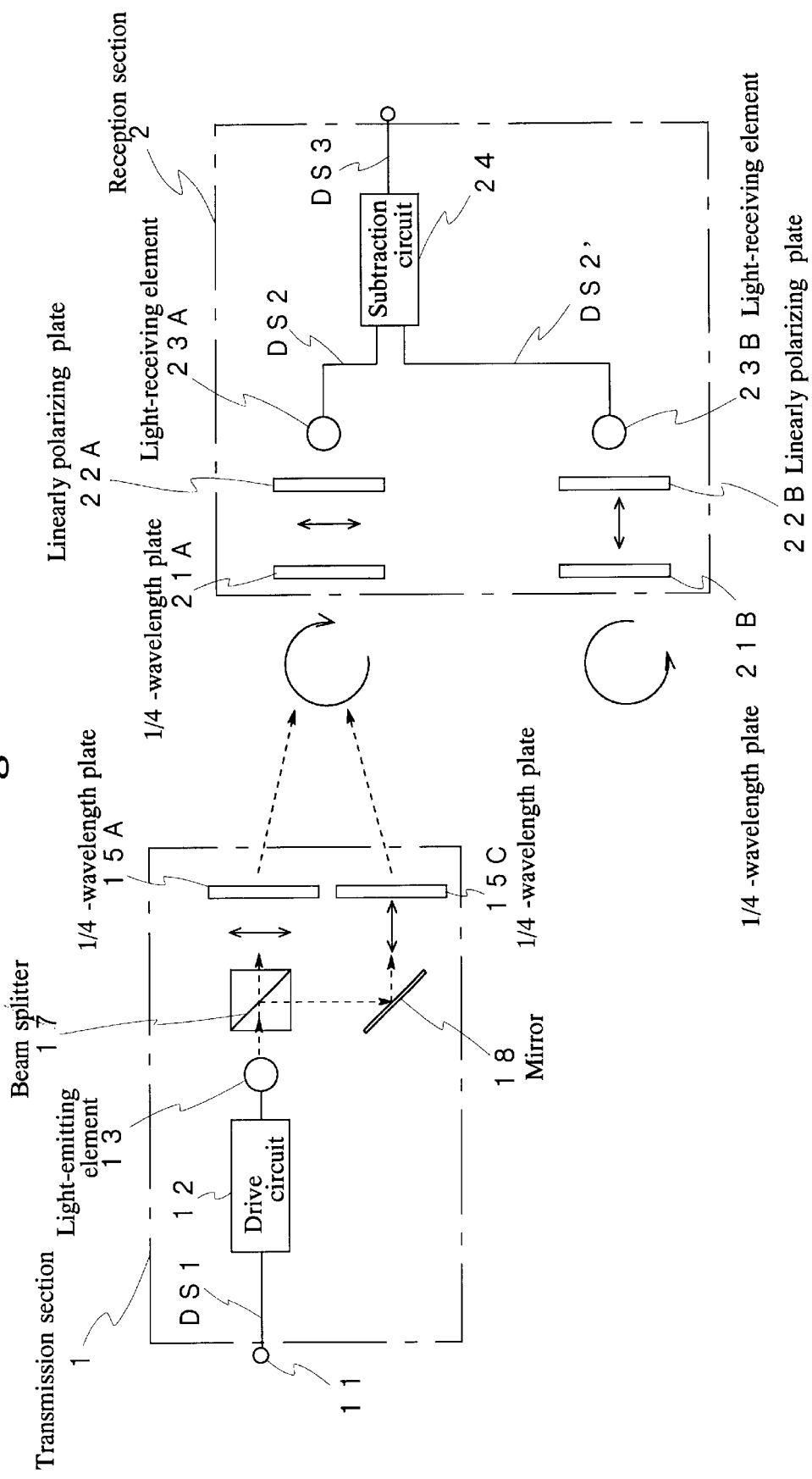
FIG. 1 is a diagram showing the arrangement of an optical digital communication apparatus according to the first embodiment of the present invention.

FIG. 1 is a diagram showing the arrangement of an optical digital communication apparatus according to a first embodiment of the present invention. The same reference numerals as in FIG. 1 denote the same parts in the first prior art described above, and a description thereof will be omitted. The first prior art is different from the first embodiment in that a beam splitter 17 is arranged in place of the linearly polarizing plate 14 in the first prior art and that a mirror 18 and a ¼-wavelength plate 15C are arranged in a transmission section 1.

More specifically, the beam splitter 17 is arranged on the light emission side of a light-emitting element 13. In this manner, light being incident from the light-emitting element 13 on the beam splitter 17 is split into two light components, i.e., a first emission light component and a second emission light component emitted at an angle different from that of the first emission light component, and the two light components are emitted. At this time, the first and second emission light components are emitted as linearly polarized light components having polarization surfaces which are orthogonal to each other.

Figure 5:
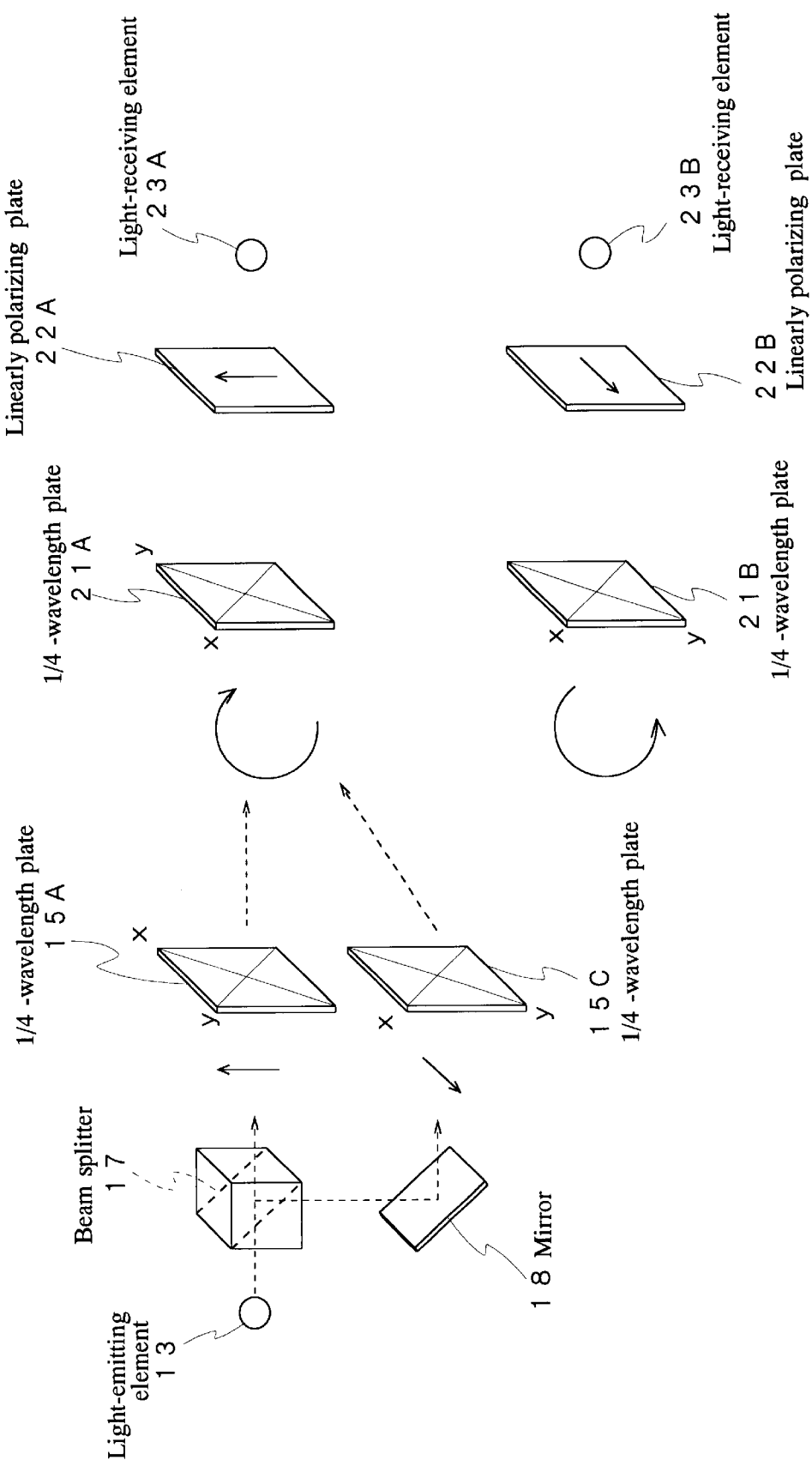
FIG. 5 is a diagram showing the relationship between a beam splitter and a ¼-wavelength plate in the first embodiment of the present invention.

One ¼-wavelength plate 15A is arranged at a position where the first emission light component is incident, and, as shown in FIG. 5, the ¼-wavelength plate 15A is arranged such that the angle of the polarization surface of the first emission light is offset by 45° with respect to optical axes x and y of the ¼-wavelength plate 15A. In this manner, the first emission light component emitted from the beam splitter 17 passes through the ¼-wavelength plate 15A to be converted into a circularly polarized light component, and the circularly polarized light component is emitted into space.

The second emission light component emitted from the beam splitter 17 is reflected by the mirror 18 to be incident on the other ¼-wavelength plate 15C. The ¼-wavelength plate 15C, as shown in FIG. 5, is arranged such that the angle of the polarization surface of the second emission light component is offset by 45° with respect to optical axes x and y of the ¼-wavelength plate 15C. In this manner, the second emission light component is converted by the ¼-wavelength plate 15C into a circularly polarized light component having the same rotating direction as that of the circularly polarized light component emitted from one ¼-wavelength plate 15A, and the circularly polarized light component is emitted into space.

On the other hand, a reception section 2 is constituted by ¼-wavelength plates 21A and 21B, linearly polarizing plates 22A and 22B, light-receiving elements 23A and 23B, and a subtraction circuit 24.

The light-receiving element 23A receives an optical signal radiated from the transmission section and converts the optical signal into an electric signal DS2 to output the electric signal DS2. The light-receiving element 23B receives disturbance light scattered in space and converts the disturbance light into an electric signal DS2' to output the electric signal DS2'.

The ¼-wavelength plate 21A for converting the circularly polarized light components emitted from the two ¼-wavelength plates 15A and 15C of the transmission section 1 into linearly polarized light components, and the linearly polarizing plate 22A which transmits only the linearly polarized light components emitted from the ¼-wavelength plate 21A to cause the linearly polarized light components to be incident on the light-receiving element 23A are arranged on the light incident side of the light-receiving element 23A.

In addition, the ¼-wavelength plate 21B for converting a circularly polarized light component having a rotating direction reversed to the rotating direction of the circularly polarized light component emitted from the transmission section 1 into a linearly polarized light component, and the linearly polarizing plate 22B which transmits only the linearly polarized light component emitted from the ¼-wavelength plate 21B to cause the linearly polarized light component to be incident on the light-receiving element 23B are arranged on the light incident side of the light-receiving element 23B.

More specifically, the linearly polarizing plates 22A and 22B are arranged such that the angles of the polarization surfaces are offset by 45° with respect to the optical axes x and y of the ¼-wavelength plates 21A and 21B. In this manner, the circularly polarized light component emitted from the transmission section 1 is reproduced by the ¼-wavelength plate 21A as a linearly polarized light component, and the linearly polarized light component passes through the linearly polarizing plate 22A to be incident on the light-receiving element 23A.

Of disturbance light scattered in space, a circularly polarized light component or an elliptically polarized light component having a rotating direction of a polarization surface different from that of the circularly polarized light component emitted from the transmission section 1 passes through the ¼-wavelength plate 21B to be converted into a linearly polarized light component, and the linearly polarized light component passes through the linearly polarizing plate 22B to be incident on the light-receiving element 23B.

The output signals DS2 and DS2' of the two light-receiving elements 23A and 23B are input to the subtraction circuit 24.

The subtraction circuit 24 outputs an electric signal DS3 having a voltage level obtained by subtracting the voltage level of the electric signal DS2' output from the other light-receiving element 23B from the voltage level of the electric signal DS2 output from one light-receiving element 23A.

Figure 6:
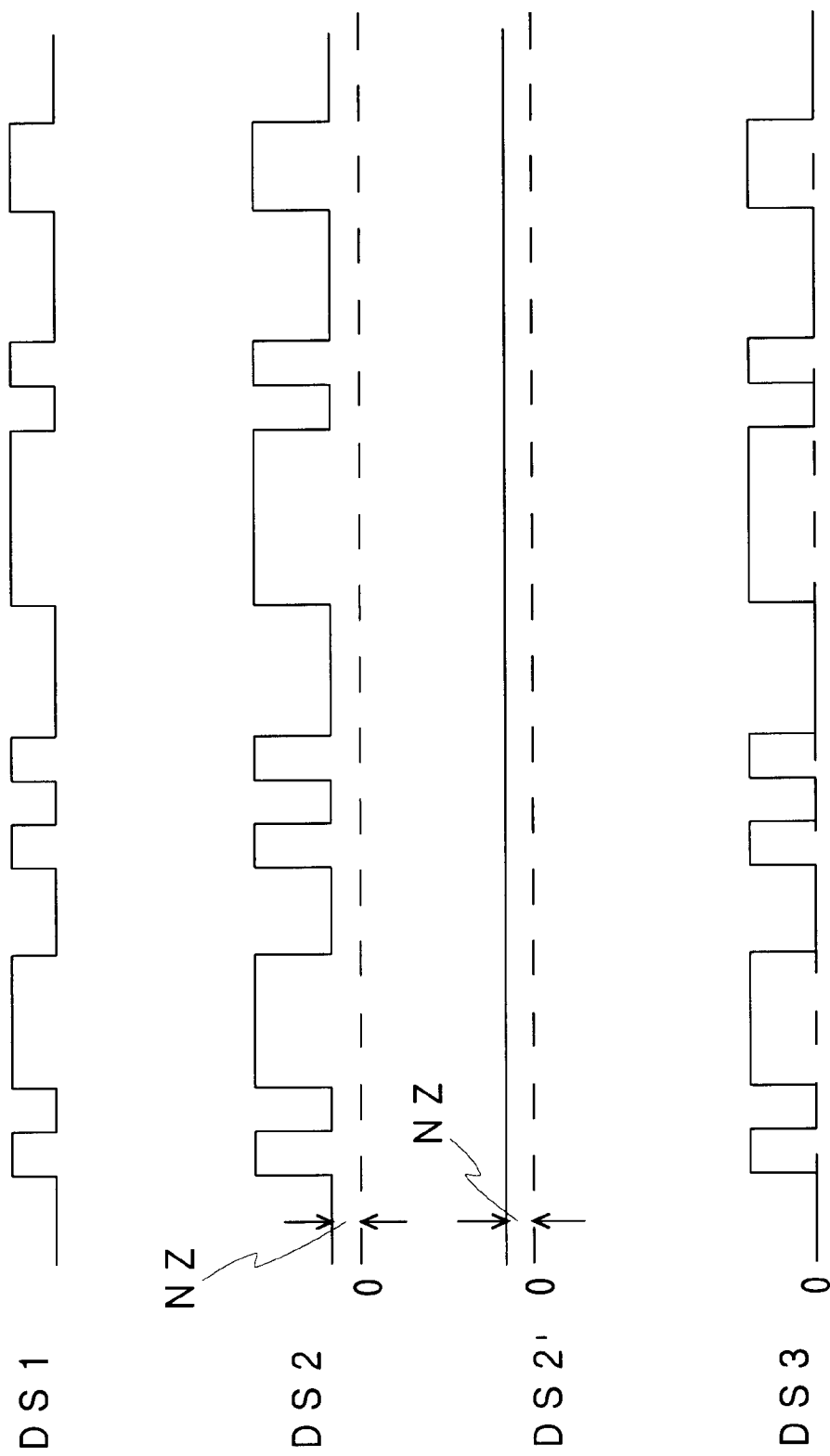
FIG. 6 is a signal waveform chart in the first embodiment of the present invention.

With the arrangement described above, as shown in the waveform chart in FIG. 6, disturbance optical noise components NZ equally input to the two light-receiving elements 23A and 23B are removed by the subtraction circuit 24. The electric signal DS2 output from one light-receiving element 23A has the same phase as that of the digital signal DS1 serving as an object of transmission, and the electric signal DS2' output from the light-receiving element 23B includes only a disturbance optical noise component. For this reason, when a difference between the voltage levels of these electric signals is calculated, the electric signal DS3 having the same phase as that of the digital signal DS1 serving as an object of transmission and having an electric signal level equal to that of the electric signal from the light-receiving element 23A can be obtained.

Therefore, only a digital signal can be obtained by removing disturbance optical noise, influence of disturbance optical noise can be considerably reduced, and a communication distance can be extended.

Since signal light propagates in space as a circularly polarized light component, a variation in reception level caused by rotating angles of the transmission section 1 and the reception section 2 is prevented.

In addition, the circularly polarized light components radiated through the two ¼-wavelength plates 15A and 15C of the transmission section 1 are converted into linearly polarized light components through one ¼-wavelength plate 21A of the reception section 2 to be incident on the light-receiving element 23A. For this reason, the intensity of light being incident on the light-receiving element 23A is almost equal to the intensity of light radiated from the light-emitting element 13 within a solid angle obtained when the light-receiving surface of the reception section 2 is viewed from the light-emitting surface (position of wavelength plate) of the transmission section 1. In this manner, when the radiation intensity of light radiated from the light-emitting element 13 is equal to that in the prior art, the intensity of the light-received by the light-receiving surface is twice the intensity of light in the prior art. For this reason, the intensity of signal light can be increased without increasing power consumption in the transmission section 1, and an S/N ratio can be improved.

The second embodiment of the present invention will be described below.

Figure 7:
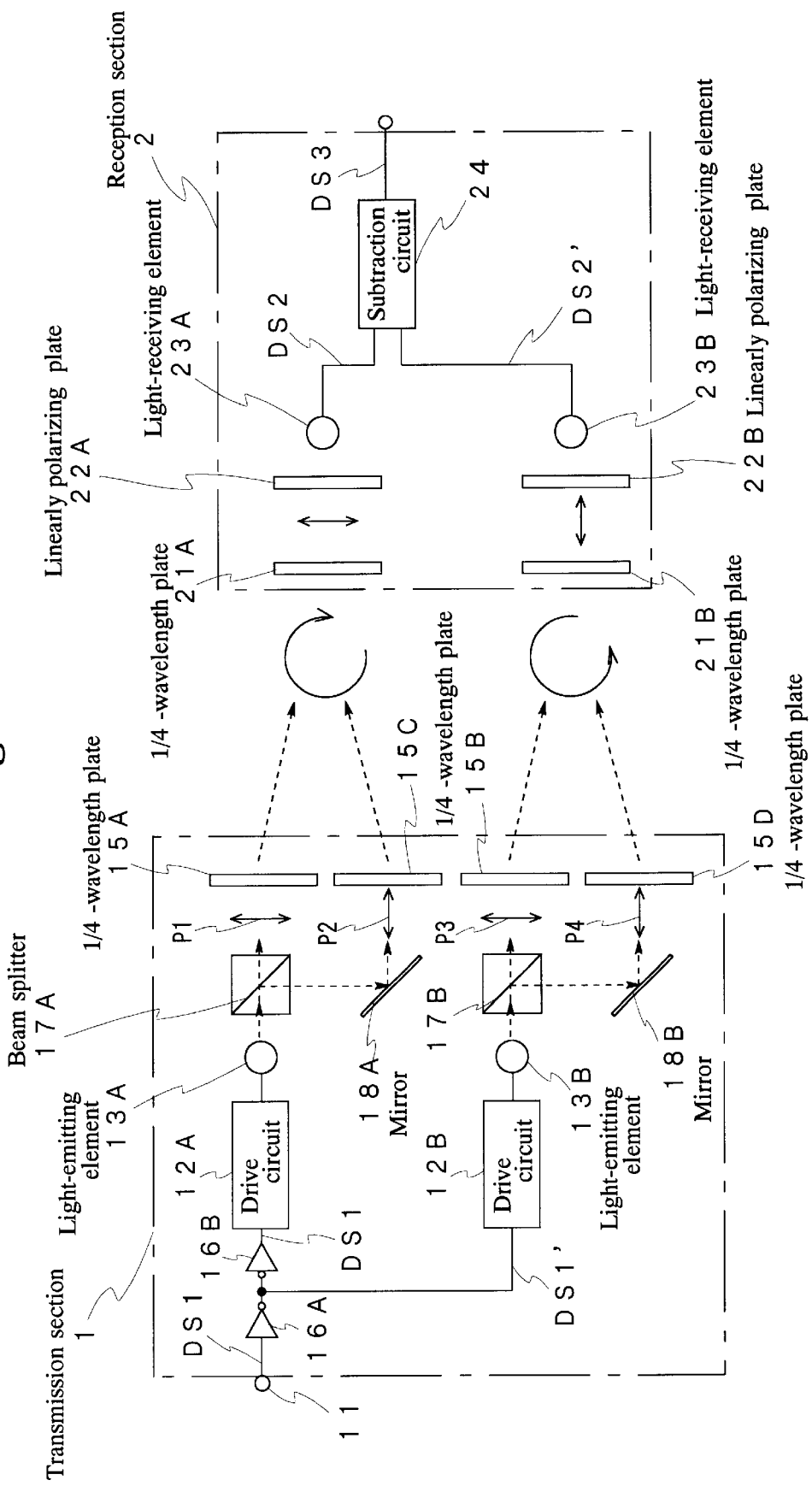
FIG. 7 is a diagram showing the arrangement of an optical digital communication apparatus according to the second embodiment of the present invention.

FIG. 7 is a diagram showing the arrangement of an optical digital communication apparatus according to the second embodiment. The same reference numerals as in the first embodiment denote the same parts in the second embodiment, and a description thereof will be omitted. The first embodiment is different from the second embodiment in that two light-emitting elements 13A and 13B are driven on the basis of a digital signal DS1 serving as an object of transmission and a digital signal DS1' obtained by inverting the digital signal DS1 as in the second prior art and that the emitted light components are radiated in the air as two types of circularly polarized light components which can be received by a reception section 2 and having different rotating directions. At this time, the light components emitted from the light-emitting elements 13A and 13B are radiated to be branched to two systems through a beam splitter.

More specifically, the digital signal DS1 serving as an object of transmission and input to a digital signal input terminal 11 is input to a drive circuit 12A through NOT circuits 16A and 16B which are connected in series with each other, and is input to a drive circuit 12B through only the NOT circuit 16A. In this manner, the digital signal input to the drive circuit 12A, i.e., a digital signal DS1' obtained by inverting the digital signal serving as an object of transmission is input to the drive circuit 12B.

The drive circuit 12A has the same arrangement as that of the drive circuit 12B. The drive circuits 12A and 12B drive the light-emitting elements 13A and 13B connected to the drive circuits 12A and 12B, respectively, to cause the light-emitting elements 13A and 13B to emit light.

Beam splitters 17A and 17B are arranged on the light emission sides of the light-emitting elements 13A and 13B, respectively.

Light being incident from the light-emitting element 13A on the beam splitter 17A is split into two light components, i.e., a first emission light component P1 and a second emission light component P2 emitted at an angle different from that of the first emission light component P1, and the first emission light component P1 and the second emission light component P2 are emitted. At this time, the first and second emission light components P1 and P2 are emitted as linearly polarized light components having polarization surfaces which are orthogonal to each other.

Figure 8:
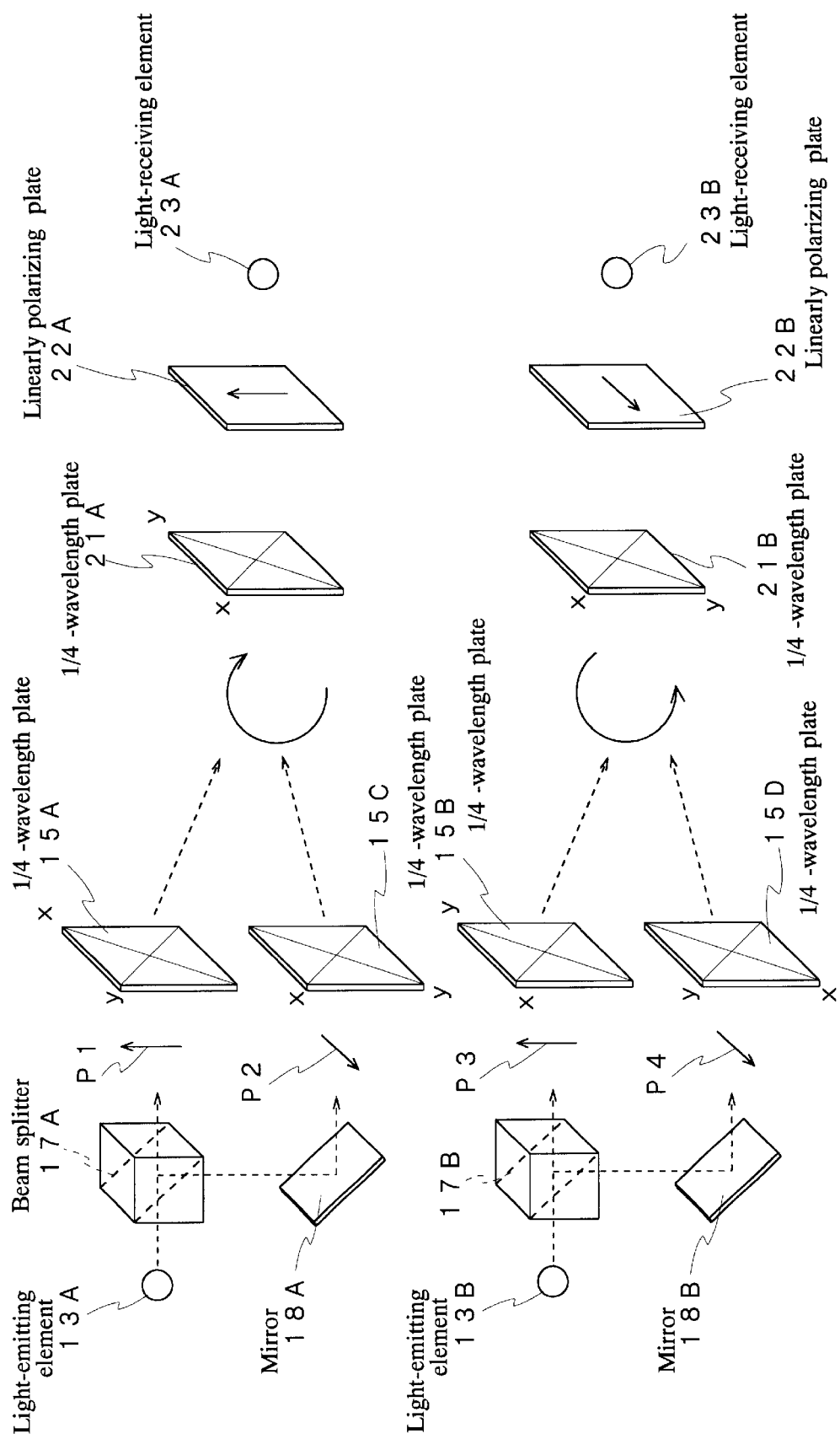
FIG. 8 is a diagram showing the relationship between a beam splitter and a ¼-wavelength plate in the second embodiment of the present invention.

A ¼-wavelength plate 15A is arranged on the emission side of the first emission light component P1. The ¼-wavelength plate 15A, as shown in FIG. 8, is arranged such that the angle of the polarization surface of the first emission light component P1 is offset by 45° with respect to optical axes x and y of the ¼-wavelength plate 15A. In this manner, the first emission light component P1 emitted from the beam splitter 17A is converted into a circularly polarized light component through the ¼-wavelength plate 15A, and the circularly polarized light component is emitted into space.

In addition, the second emission light component P2 emitted from the beam splitter 17A is reflected by a mirror 18A to be incident on a ¼-wavelength plate 15C. The ¼-wavelength plate 15C, as shown in FIG. 8, is arranged such that the angle of the polarization surface of the second emission light component P2 is offset by 45° with respect to optical axes x and y of the ¼-wavelength plate 15C. In this manner, the second emission light component P2 is converted by the ¼-wavelength plate 15C into a circularly polarized light component having the same rotating direction as that of the circularly polarized light component emitted from the ¼-wavelength plate 15A, and the circularly polarized light component is emitted into space.

Light being incident from the light-emitting element 13B on the beam splitter 17B is split into two light components, i.e., a first emission light component P3 and a second emission light component P4 emitted at an angle different from that of the first emission light component P3, and the first emission light component P3 and the second emission light component P4 are emitted. At this time, the first and second emission light components P3 and P4 are emitted as linearly polarized light components having polarization surfaces which are orthogonal to each other.

A ¼-wavelength plate 15B is arranged on the emission side of the first emission light component P3. The ¼-wavelength plate 15B, as shown in FIG. 8, is arranged such that the angle of the polarization surface of the first emission light component P3 is offset by 45° with respect to optical axes x and y of the ¼-wavelength plate 15A. In this manner, the first emission light component P3 emitted from the beam splitter 17B is converted by the ¼-wavelength plate 15B into a circularly polarized light component having a rotating direction different from those of the circularly polarized light components radiated from the two ¼-wavelength plates 15A and 15C described above, and the circularly polarized light component is emitted into space.

In addition, the second emission light component P4 emitted from the beam splitter 17B is reflected by a mirror 18B to be incident on a ¼-wavelength plate 15D. The ¼-wavelength plate 15D, as shown in FIG. 8, is arranged such that the angle of the polarization surface of the second emission light component P4 is offset by 45° with respect to optical axes x and y of the ¼-wavelength plate 15D. In this manner, the second emission light component P4 is converted by the ¼-wavelength plate 15D into a circularly polarized light component having the same rotating direction as that of the circularly polarized light component emitted from the ¼-wavelength plate 15B, and the circularly polarized light component is emitted into space in the same direction as that of the circularly polarized light component emitted from the ¼-wavelength plate 15B.

On the other hand, the reception section 2 is constituted by ¼-wavelength plates 21A and 21B, linearly polarizing plates 22A and 22B, light-receiving elements 23A and 23B, and a subtraction circuit 24.

The light-receiving elements 23A and 23B receive optical signals radiated from the transmission section 1 and convert the optical signals into electric signals DS2 and DS2' to output the electric signals DS2 and DS2', respectively.

The ¼-wavelength plate 21A for converting circularly polarized light components emitted from the two ¼-wavelength plates 15A and 15C of the transmission section 1 into linearly polarized light components and the linearly polarizing plate 22A which transmits only the linearly polarized light components emitted from the ¼-wavelength plate 21A to cause the linearly polarized light component to be incident on the light-receiving element 23A are arranged on the light incident side of the light-receiving element 23A.

In addition, the ¼-wavelength plate 21B for converting circularly polarized light components emitted from the two ¼-wavelength plates 15B and 15D of the transmission section 1 into linearly polarized light components, and the linearly polarizing plate 22B which transmits only the linearly polarized light component emitted from the ¼-wavelength plate 21B to cause the linearly polarized light component to be incident on the light-receiving element 23B are arranged on the light incident side of the light-receiving element 23B.

More specifically, the linearly polarizing plates 22A and 22B are arranged such that the angles of the polarization surfaces are offset by 45° with respect to the optical axes x and y of the ¼-wavelength plates 21A and 21B. In this manner, the circularly polarized light component (circularly polarized light components emitted from the ¼-wavelength plates 15A and 15C) emitted from the transmission section 1 and having one rotating direction is reproduced by the ¼-wavelength plate 21A as a linearly polarized light component, and the linearly polarized light component passes through the linearly polarizing plate 22A to be incident on the light-receiving element 23A.

The circularly polarized light component (circularly polarized light components emitted from the ¼-wavelength plates 15B and 15D) emitted from the transmission section 1 and having the other rotating direction is reproduced by the ¼-wavelength plate 21B as a linearly polarized light component, and the linearly polarized light component passes through the linearly polarizing plate 22B to be incident on the light-receiving element 23B.

The output signals DS2 and DS2' from the light-receiving elements 23A and 23B are input to the subtraction circuit 24.

The subtraction circuit 24 outputs an electric signal DS3 having a voltage level obtained by subtracting the voltage level of the electric signal DS2' output from the other light-receiving element 23B from the voltage level of the electric signal DS2 output from one light-receiving element 23A.

Figure 9:
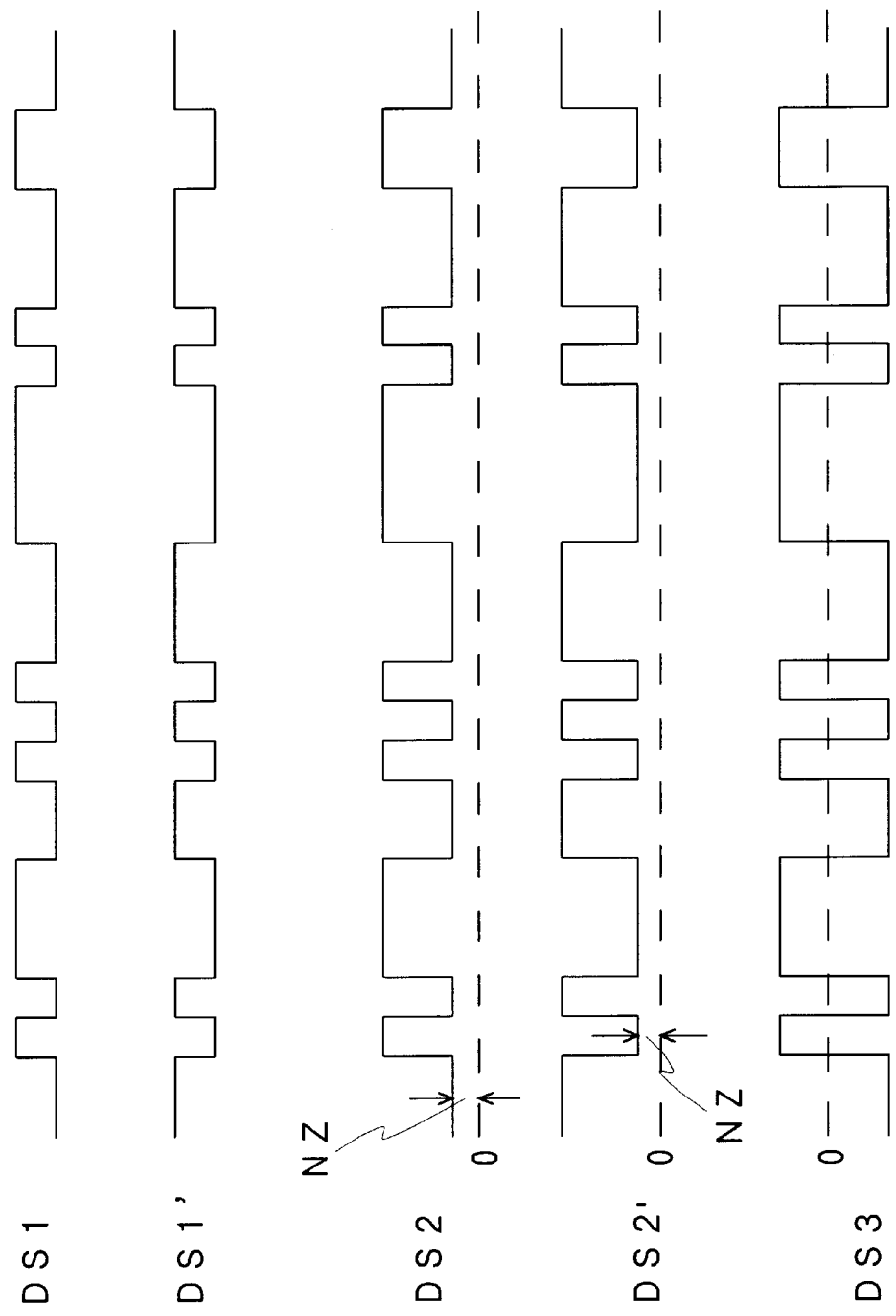
FIG. 9 is a signal waveform chart in the second embodiment of the present invention.

With the arrangement described above, as shown in the waveform chart in FIG. 9, disturbance optical noise components NZ equally input to the two light-receiving elements 23A and 23B are removed by the subtraction circuit 24. The electric signal DS2 output from one light-receiving element 23A has the same phase as that of the digital signal DS1 serving as an object of transmission, and the electric signal DS2' output from the light-receiving element 23B has a phase which is different by 180° from the phase of the digital signal DS1 serving as an object of transmission. For this reason, when a difference between the voltage levels of these electric signals is calculated, the electric signal DS3 having the same phase as that of the digital signal DS1 serving as an object of transmission and having a level obtained by adding the levels of the electric signals output from the two light-receiving elements 23A and 23B.

Therefore, since a light component propagates in space as a circularly polarized light component, a variation in reception level caused by rotating angles of the transmission section 1 and the reception section 2 is prevented, and only a digital signal serving as an object of transmission can be obtained by removing disturbance optical noise. Influence of disturbance optical noise can be considerably reduced in comparison with a prior art, and a communication distance can be extended.

In addition, the circularly polarized light components radiated through the two ¼-wavelength plates 15A and 15C of the transmission section 1 are converted into linearly polarized light components through one ¼-wavelength plate 21A of the reception section 2 to be incident on the light-receiving element 23A. For this reason, the intensity of light being incident on the light-receiving element 23A is almost equal to the intensity of light emitted from the light-emitting element 13A within a solid angle obtained when the light-receiving surface of the reception section is viewed from the light-emitting surface (position of wavelength plate) of the transmission section 1. Furthermore, the circularly polarized light components radiated through the two ¼-wavelength plates 15B and 15D of the transmission section 1 are converted into linearly polarized light components through the other ¼-wavelength plate 21B of the reception section 2 to be incident on the light-receiving element 23B. For this reason, the intensity of light being incident on the light-receiving element 23B is almost equal to the intensity of light emitted from the light-emitting element 13B within a solid angle obtained when the light-receiving surface of the reception section is viewed from the light-emitting surface (position of wavelength plate) of the transmission section 1. More specifically, when the radiation intensities of light components radiated from the light-emitting elements 13A and 13B are equal to that in the prior art, the intensities of the light components received by the light-receiving surfaces are twice the intensity of light in the prior art. For this reason, the intensity of signal light can be increased without increasing power consumption in the transmission section 1, and an S/N ratio can be improved.

In the first and second embodiments described above, although the mirrors 18 (18A) and 18B are used as means for guiding light components from the beam splitters 17 (17A) and 17B to the ¼-wavelength plates 15C and 15D, other light guide means may be used. For example, light components may also be guided by combining a plurality of beam splitters, a plurality of prisms, and the like.

The third embodiment of the present invention will be described below.

Figure 2:
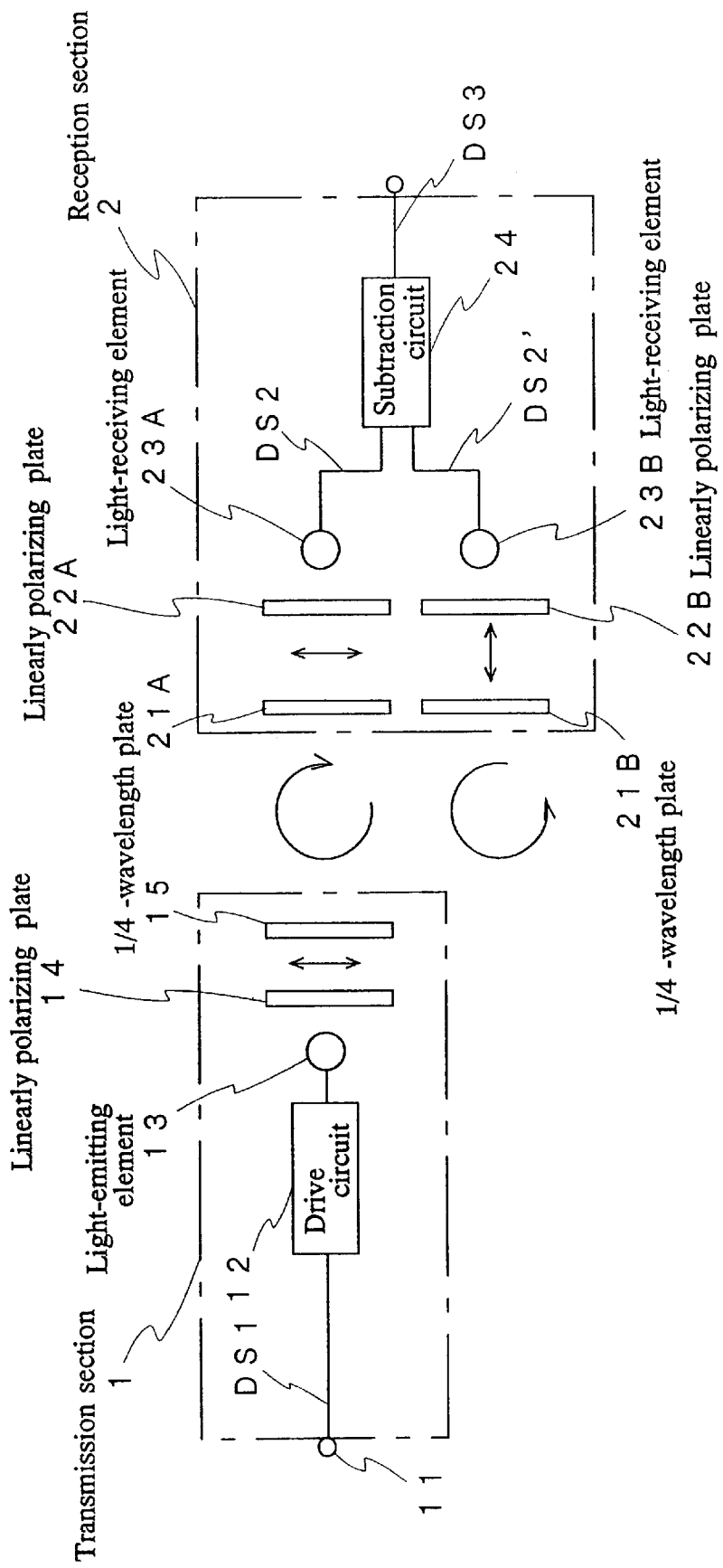
FIG. 2 is a diagram showing the arrangement of an optical digital communication apparatus according to the first prior art.

An optical system circuit according to the third embodiment is similar to that in the first prior art (FIG. 2). The first prior art is different from the third embodiment in the electric system circuit of a reception section 2.

Figure 10:
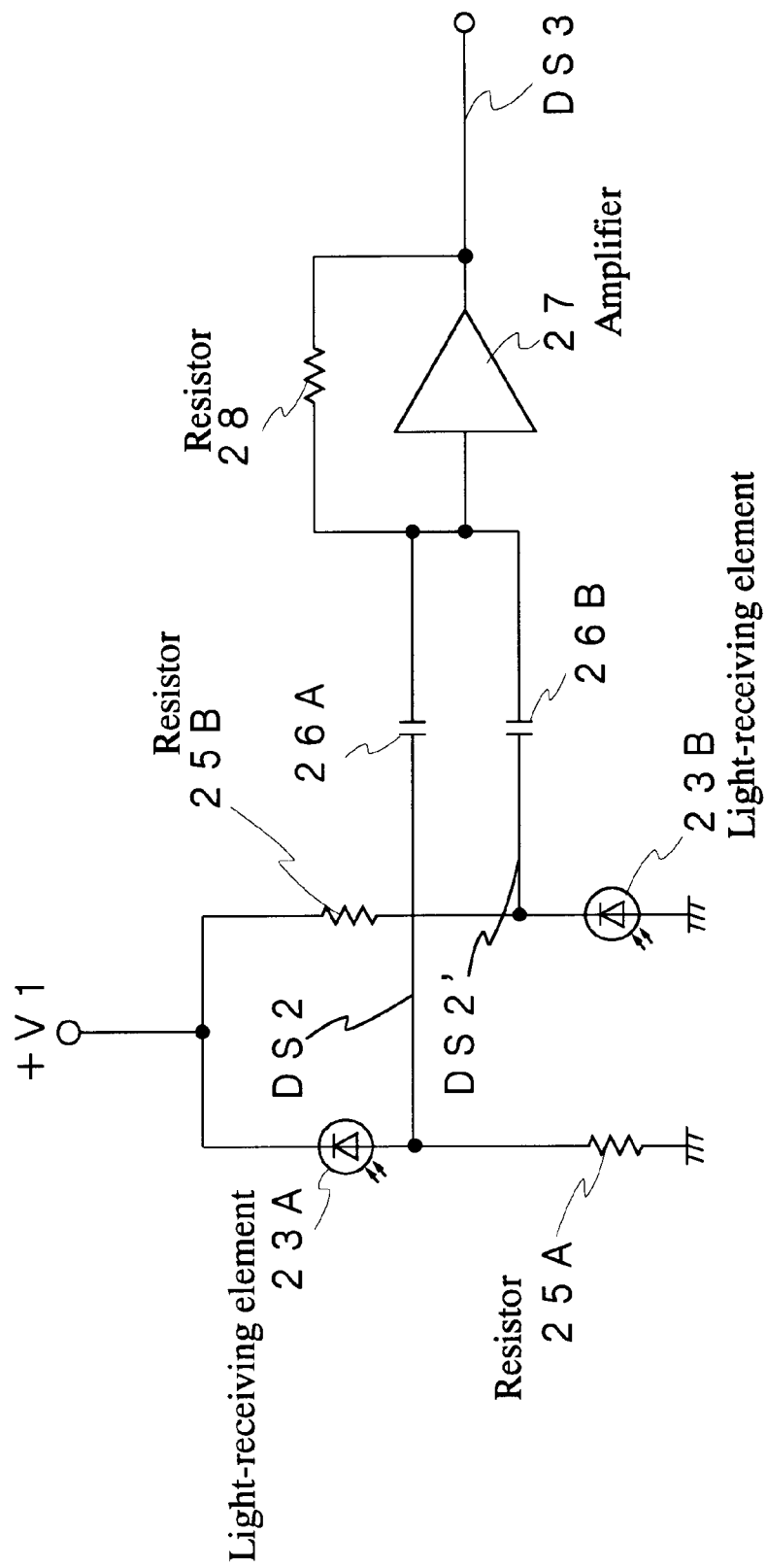
FIG. 10 is a diagram showing the arrangement of an electric system circuit of a reception section in the third embodiment of the present invention.
Figure 11:
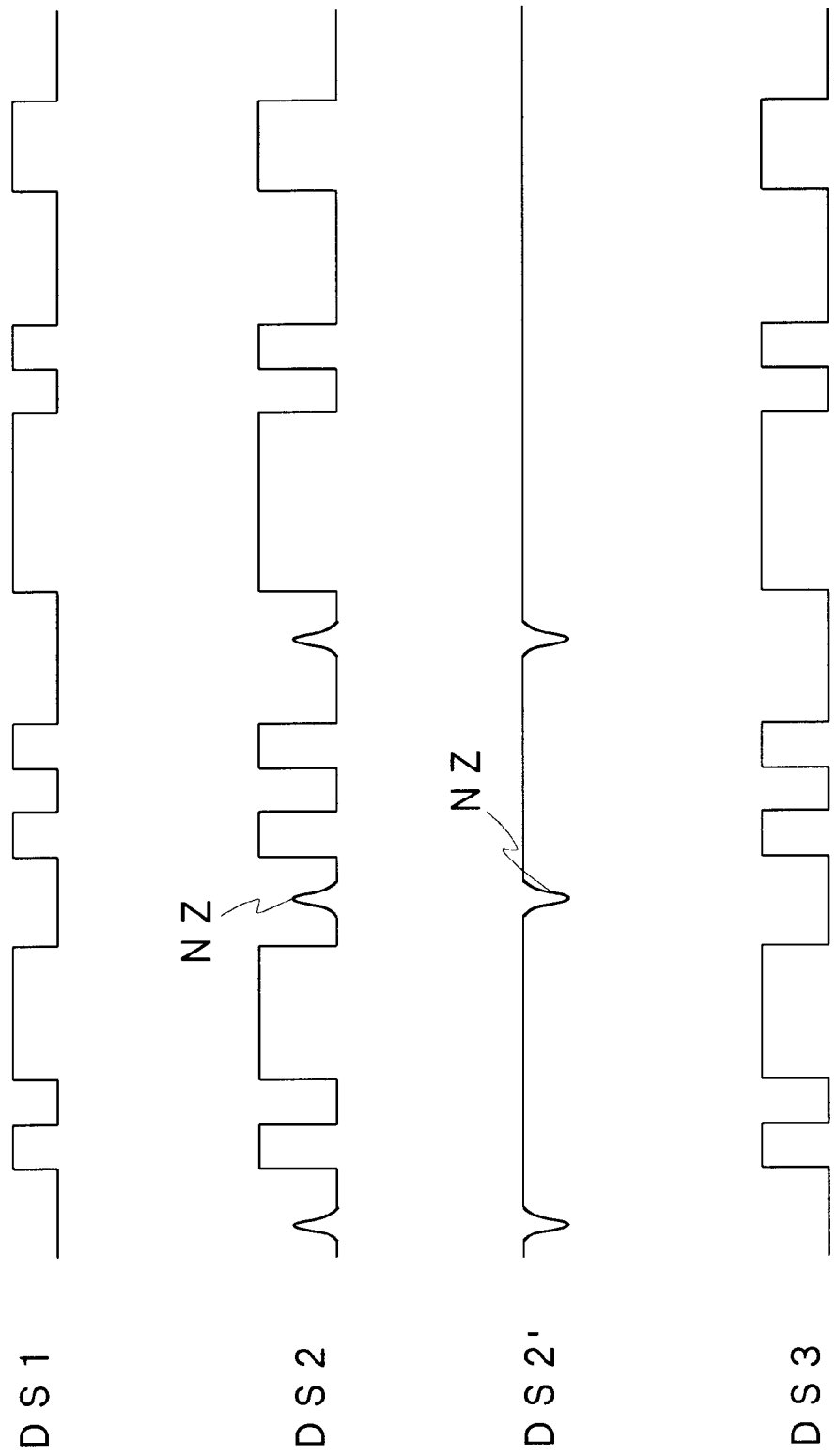
FIG. 11 is a signal waveform chart in the third embodiment of the present invention.

More specifically, the electric system circuit of the reception section 2 in the third embodiment, as shown in FIG. 10, is constituted by light-receiving elements 23A and 23B constituted by PIN photodiodes, resistors (impedance elements) 25A and 25B, capacitors 26A and 26B, an amplifier 27, and a resistor 28. In this case, the amplifier 27 is of a voltage conversion type.

The cathode of the light-receiving element 23A is connected to a power supply to be applied with a voltage +V1, and the anode is grounded through the resistor 25A and connected to the input terminal of the amplifier 27 through the capacitor 26A. The cathode of the light-receiving element 23B is connected to the power supply through the resistor 25B to be applied with a voltage +V1, and is connected to the input terminal of the amplifier 27 through the capacitor 26B, and the anode is grounded. In addition, the resistor 28 is connected between the input terminal and the output terminal of the amplifier 27.

A resistance R1 of the resistor 25A is set to be a value (R1<<Rd1) which is considerably smaller than a reverse bias resistance Rd1 of the light-receiving element 23A, and a resistance R2 of the resistor 25B is set to be a value (R2<<Rd2) which is considerably smaller than a reverse bias resistance Rd2 of the light-receiving element 23B. In this manner, a current (I1−I2) having a difference between an AC component of an output current I1 from the light-receiving element 23A and the AC component of an output current I2 from the light-receiving element 23B is input to the input terminal of the amplifier 27. The current is converted by the amplifier 27 into a voltage, and the voltage is output.

In the arrangement described above, when no light is incident on the light-receiving element 23A, the potential of the anode of the light-receiving element 23A becomes a value which is close to 0 V. More specifically, when no light is incident on the light-receiving element 23A, a voltage applied across the anode and the cathode of the light-receiving element 23A becomes a voltage obtained such that the power supply voltage +V1 is divided by the reverse bias resistance of the light-receiving element 23A and the resistance of the resistor 25A, and the potential of the anode of the light-receiving element 23A is smaller than ½ of the power supply voltage +V1. In addition, since the resistance R1 of the resistor 25A is set to be considerably smaller than the reverse bias resistance Rd1 of the light-receiving element 23A, the potential of the anode of the light-receiving element 23A is set to be a potential which is close to 0 V.

When light is incident on the light-receiving element 23A, the resistance of the light-receiving element 23A decreases depending on the intensity of the incident light, and a voltage applied across the anode and the cathode of the light-receiving element 23A. Accordingly, the voltage across both the terminals of the resistor 25A increases. Therefore, the potential of the anode of the light-receiving element 23A positively changes in response to the intensity of light incident on the light-receiving element 23A.

On the other hand, no light is incident on the other light-receiving element 23B, the potential of the cathode of the light-receiving element 23B becomes a potential which is close to the power supply voltage +V1. More specifically, when no light is incident on the light-receiving element 23B, a voltage applied across the anode and the cathode of the light-receiving element 23B becomes a voltage obtained such that the power supply voltage +V1 is divided by the reverse bias resistance Rd2 of the light-receiving element 23B and the resistance R2 of the resistor 25B, and the potential of the cathode of the light-receiving element 23B is larger than ½ of the power supply voltage +V1. In addition, since the resistance R2 of the resistor 25B is set to be considerably smaller than the reverse bias resistance Rd2 of the light-receiving element 23B, the potential of the cathode of the light-receiving element 23B is set to be a potential which is close to the power supply voltage +V1.

When light is incident on the light-receiving element 23B, the resistance of the light-receiving element 23B decreases depending on the intensity of the incident light, and a voltage applied across the anode and the cathode of the light-receiving element 23B. Accordingly, the voltage across both the terminals of the resistor 25B increases. Therefore, the potential of the cathode of the light-receiving element 23B negatively changes in response to the intensity of light incident on the light-receiving element 23B.

In addition, an AC component at the anode of one light-receiving element 23A passes through one capacitor 26A, and an AC component at the cathode of the other light-receiving element 23B passes through the other capacitor 26B, so that these AC components are synthesized with each other at the input terminal of the amplifier 27. A synthetic voltage of the two AC components is obtained as a reproduction signal DS3. In this manner, a noise component commonly appearing in the two AC components is removed.

Figure 3:
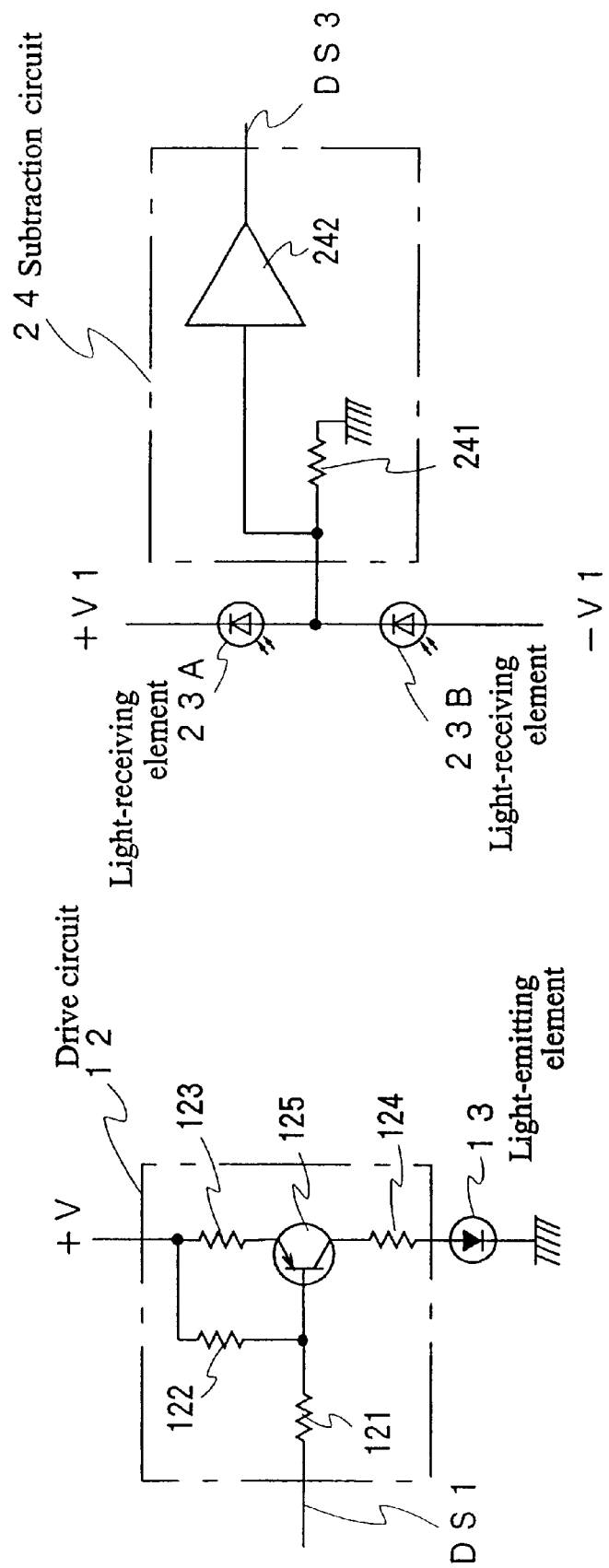
FIG. 3 is a diagram showing the arrangement of an electric system circuit in the first prior art.
Figure 4:
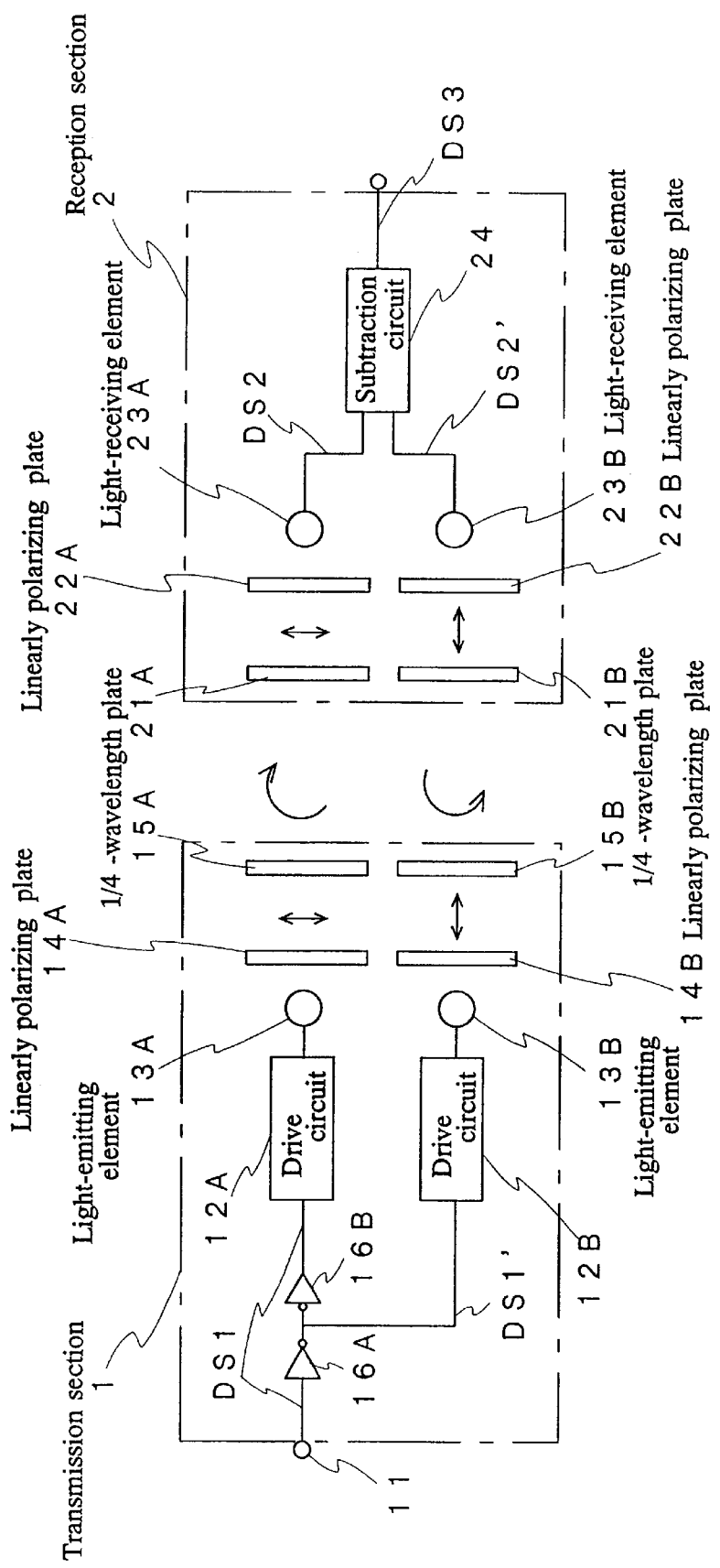
FIG. 4 is a diagram showing the arrangement of an optical digital communication apparatus according to the second prior art.

Therefore, in comparison with the electric system circuit (FIG. 3) of the reception section 2 in the first prior art described above, two types of power supplies need not be arranged, and the circuit can be simplified and reduced in size. Since voltages applied to the two light-receiving elements 23A and 23B becomes a value which is close to the power supply voltage "+V1", a signal amplitude is larger than that in the prior art using a single power supply. For this reason, sensitivity and a response speed can be improved.

Figure 12:
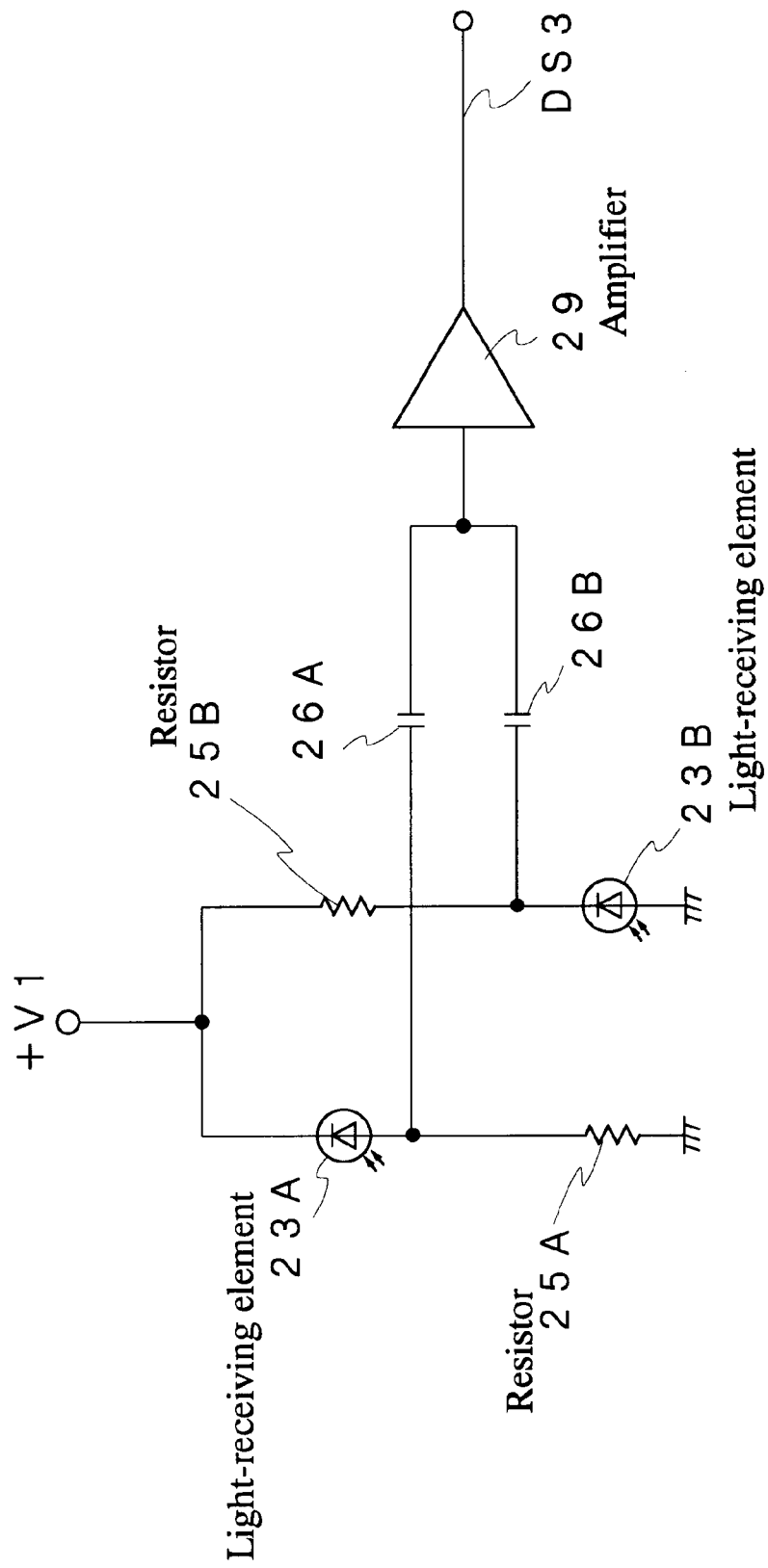
FIG. 12 is a diagram showing another example of the electric system circuit of the reception section in the third embodiment of the present invention.

When the amplifier 27 is of a high-impedance type, as shown in FIG. 12, the resistor 28 may be removed, and an amplifier 29 having an input impedance Zin which is considerably larger than the resistances of the resistors 25A and 25B may be used.

When the reception section 2 of this embodiment is applied to the first embodiment described above, sensitivity, a response speed, an S/N ratio, and the like can be more improved.

In addition, light used in the embodiments described above is not limited to specific one. Even if infrared rays or light other than infrared rays are used, the same effect as described above can be obtained.

The electric system circuits according to the embodiments described above are examples, and the present invention is not limited to the electric system circuits.

As shown in FIG. 13, a basic digital signal DSbs may be processed to generate a digital signal DS1 in which "1" and "0" are expressed by "1,0" and "0,1", respectively (or "1" and "0" are expressed by "0,1" and "1,0", respectively), and the digital signal DS1 may be used as a digital signal serving as a transmission object.

The description of the means and the embodiments of the present invention for solving the prior arts and the problems will be necessary and sufficient to explain the contents of the present invention to persons skilled in the art. The present invention is not limited to the arrangements of the embodiments, as a matter of course.

What is claimed is:

1. An optical digital communication apparatus comprising a transmission section for emitting an optical signal corresponding to a digital signal serving as an object of transmission and a reception section for receiving the optical signal and converting the optical signal into a digital signal, characterized in that the transmission section including:
a light-emitting element for emitting light in response to a digital signal serving as an object of transmission; and
optical signal emission means for dividing the optical signal emitted from the light-emitting element in two as two linearly polarized light components which are orthogonal to each other and for emitting the two linearly polarized light components as circularly polarized light components or elliptically polarized light components having the same rotating direction, and the reception section including:
first light-receiving means for receiving only circularly polarized light components or elliptically polarized light components having the rotating direction of the circularly polarized light components or the elliptically polarized light components emitted from the optical signal emission means of the transmission section to convert the circularly polarized light components or the elliptically polarized light components into an electric signal;
second light-receiving means for receiving only circularly polarized light components or elliptically polarized light components having a rotating direction different from that of the circularly polarized light components or the elliptically polarized light components emitted from the optical signal emission means of the transmission section to convert the circularly polarized light components or the elliptically polarized light components into an electric signal; and subtraction means for receiving the electric signal output from the first light-receiving means and the electric signal output from the second light-receiving means to output a difference between the two electric signal levels.

2. An optical digital communication apparatus according to claim 1, characterized in that the optical signal emission means is constituted by:
a beam splitter, on which light emitted from the light-emitting element is incident, for emitting the incident light as two linearly polarized light components which are orthogonal to each other;
a first wavelength plate, on which one linearly polarized light component emitted from the beam splitter is incident, for emitting the light component as a circularly polarized light component or an elliptically polarized light component having one rotating direction in a predetermined transmission direction;
a second wavelength plate, on which the other linearly polarized light component emitted from the beam splitter, for emitting the light component as a circularly polarized light component or an elliptically polarized light component having one rotating direction in the transmission direction; and
guide means for causing the other linearly polarized light component emitted from the beam splitter to be incident on the second wavelength plate.

3. An optical digital communication apparatus according to claim 2, characterized in that the guide means is constituted by a mirror.

4. An optical digital communication apparatus according to claim 1, characterized in that the reception section is constituted by:
a third wavelength plate, on which a circularly polarized light component or an elliptically polarized light component having a first rotating direction is incident, for emitting a light component as a linearly polarized light component;
a first linearly polarizing plate arranged to transmit only the linearly polarized light component emitted from the third wavelength plate;
a fourth wavelength plate, on which a circularly polarized light component or an elliptically polarized light component having a second rotating direction different from the first rotating direction is incident, for emitting a light component as a linearly polarized light component;
a second linearly polarizing plate arranged to transmit only the linearly polarized light component emitted from the fourth wavelength plate;
a first light-receiving element, on which the linearly polarized light component emitted from the first linearly polarizing plate is incident, for converting the linearly polarized light into an electric signal;
a second light-receiving element, on which the linearly polarized light component emitted from the second linearly polarizing plate is incident, for converting the linearly polarized light component into an electric signal; and
a subtraction circuit for receiving the electric signals output from the first and second light-receiving elements and outputting a difference between these electric signal levels.

5. An optical digital communication apparatus according to claim 4, characterized in that the first light-receiving element is constituted by a photodiode having a cathode connected to a power supply,
the second light-receiving element is constituted by a photodiode having a grounded anode, and
the subtraction circuit is constituted by:
a first impedance element connected between the anode of the first light-receiving element and the ground and having a resistance lower than the resistance of the first light-receiving element;
a second impedance element connected between the cathode of the second light-receiving element and a power supply and having a resistance lower than the resistance of the second light-receiving element;
a first capacitance element connected between the anode of the first light-receiving element and a first output terminal;
a second capacitance element connected between the cathode of the second light-receiving element and a second output terminal; and
an arithmetic operation circuit for outputting an electric signal having a difference between an electric signal output from the first output terminal and an electric signal output from the second output terminal.

6. An optical digital communication apparatus comprising a transmission section for emitting an optical signal corresponding to a digital signal serving as an object of transmission and a reception section for receiving the optical signal and converting the optical signal into a digital signal, characterized in that the transmission section including:
a first light-emitting element for emitting light in response to a digital signal serving as an object of transmission;
first optical signal emission means for dividing an optical signal emitted from the first light-emitting element in two as two linearly polarized light components which are orthogonal to each other and for emitting the two linearly polarized light components as circularly polarized light components or elliptically polarized light components having a first rotating direction;
a second light-emitting element for emitting light in response to a digital signal obtained by inverting the digital signal serving as an object of transmission; and
second optical signal emission means for dividing an optical signal emitted from the second light-emitting element in two as two linearly polarized light components which are orthogonal to each other and for emitting the two linearly polarized light components as circularly polarized light components or elliptically polarized light components having a second rotating direction which is different from the first rotating direction, and the reception section including:
first light-receiving means for receiving only circularly polarized light components or elliptically polarized light components having the rotating direction of the circularly polarized light components or the elliptically polarized light components emitted from the first optical signal emission means of the transmission section to convert the circularly polarized light components or the elliptically polarized light components into an electric signal;
second light-receiving means for receiving circularly polarized light components or elliptically polarized light components having the rotating direction of the circularly polarized light components or the elliptically polarized light components emitted from the second optical signal emission means of the transmission section to convert the circularly polarized light components or the elliptically polarized light components into an electric signal; and substraction means for receiving the electric signal output from the first light-receiving means and the electric signal output from the second light-receiving means to output a difference between the two electric signal levels.

7. An optical digital communication apparatus according to claim 6, characterized in that the optical signal emission means is constituted by:

a beam splitter, on which light emitted from the light-emitting element is incident, for emitting the incident light as two linearly polarized light components which are orthogonal to each other;

a first wavelength plate, on which one linearly polarized light component emitted from the beam splitter is by incident, for emitting the light component as a circularly polarized light component or an elliptically polarized light component having one rotating direction in a predetermined transmission direction;

a second wavelength plate, on which the other linearly polarized light component emitted from the beam splitter, for emitting the light component as a circularly polarized light component or an elliptically polarized light component having one rotating direction in the transmission direction; and guide means for causing the other linearly polarized light component emitted from the beam splitter to be incident on the second wavelength plate.

8. An optical digital communication apparatus according to claim 6, characterized in that the reception section is constituted by:

a third wavelength plate, on which a circularly polarized light component or an elliptically polarized light component having a first rotating direction is incident, for emitting a light component as a linearly polarized light component;

a first linearly polarizing plate arranged to transmit only the linearly polarized light component emitted from the third wavelength plate;

a fourth wavelength plate, on which a circularly polarized light component or an elliptically polarized light component having a second rotating direction different from the first rotating direction is incident, for emitting a light component as a linearly polarized light component;

a second linearly polarizing plate arranged to transmit only the linearly polarized light component emitted from the fourth wavelength plate;

a first light-receiving element, on which the linearly polarized light component emitted from the first linearly polarizing plate is incident, for converting the linearly polarized light into an electric signal;

a second light-receiving element, on which the linearly polarized light component emitted from the second linearly polarizing plate is incident, for converting the linearly polarized light component into an electric signal; and a subtraction circuit for receiving the electric signals output from the first and second light-receiving elements and outputting a difference between these electric signal levels.

9. An optical digital communication apparatus comprising a transmission section for emitting an optical signal corresponding to a digital signal serving as an object of transmission and a reception section for receiving two different optical signals to convert the optical signals into electric signals and then reproducing the digital signal on the basis of the difference between the two electric signals, characterized in that the reception section includes: a first photodiode for receiving one optical signal to convert the optical signal into an electric signal;

a second photodiode for receiving the other optical signal to convert the optical signal into an electric signal;

a first impedance element connected between the anode of the first photodiode and the ground and having a resistance smaller than the resistance of the first photodiode;

a second impedance element connected between the cathode of the second photodiode and a power supply and having a resistance smaller than the resistance of the second photodiode;

a first capacitor connected between the anode of the first photodiode and an output terminal; and a second capacitor connected between the cathode of the second photodiode and an output terminal.

* * * * *